US009544452B2

(12) United States Patent
Honda (10) Patent No.: US 9,544,452 B2
(45) Date of Patent: Jan. 10, 2017

(54) INFORMATION PROCESSING APPARATUS, INFORMATION PROCESSING SYSTEM AND MOBILE TERMINAL READING TAGS MOUNTED ON THE DEVICE COMPONENTS FOR OBTAINING STATUS OF THE DEVICE COMPONENTS (71) Applicant: KYOCERA Document Solutions Inc., Osaka (JP)

(72) Inventor: Toru Honda, Osaka (JP)

(73) Assignee: KYOCERA Document Solutions Inc., Tamatsukuri, Chuo-ku, Osaka ( * ) Notice: Subject to any disclaimer, the term of this patent is extended or adjusted under 35 U.S.C. 154(b) by 0 days.

(21) Appl. No.: 14/835,898

(22) Filed: Aug. 26, 2015

(65) Prior Publication Data
US 2016/0065761 A1 Mar. 3, 2016

(30) Foreign Application Priority Data

Aug. 28, 2014 (JP) ................................. 2014-174242

(51) Int. Cl.
G06K 15/00 (2006.01)
H04N 1/00 (2006.01)
(52) U.S. Cl.
CPC ...... *H04N 1/00342* (2013.01); *H04N 1/00408* (2013.01); *H04N 1/00477* (2013.01); *H04N 2201/0094* (2013.01)
(58) Field of Classification Search
CPC ............ H04N 1/00339; H04N 1/00342; G06K 7/10237; G06K 7/10247; G06K 7/10297
See application file for complete search history.

(56) References Cited

U.S. PATENT DOCUMENTS

| 8,040,542 B2 | 10/2011 | Oda et al. |
| 2008/0278753 A1 | 11/2008 | Oda et al. |
| 2009/0036056 A1* | 2/2009 | Oshima ............... H04M 1/7253 455/41.3 |

(Continued)

FOREIGN PATENT DOCUMENTS

JP 2008-282217 A 11/2008

*Primary Examiner* — Benny Q Tieu
*Assistant Examiner* — Haris Sabah
(74) *Attorney, Agent, or Firm* — IP Business Solutions, LLC (57) ABSTRACT An information processing apparatus includes: a housing accommodating a plurality of component devices serving functions provided in the information processing apparatus; a plurality of tags mounted to individual locations on the housing relating to the respective associated component devices, each of the tags being embedded with a piece of device type information indicating the component device associated with the tag; a storage section configured to store a plurality of component device information sets indicating respective sets of information about the component devices; a communication section configured to send and receive data to and from a mobile terminal; and a communication control section configured to allow the communication section to receive data sent from the mobile terminal and allow the communication section to send back to the mobile terminal the component device information set about the component device indicated by the piece of device type information contained in the received data.

5 Claims, 7 Drawing Sheets

(56) References Cited

U.S. PATENT DOCUMENTS

2014/0218765 A1\* 8/2014 Sawayanagi ......... H04B 10/116
358/1.15
2014/0293306 A1\* 10/2014 Tredoux ............... H04B 5/0031
358/1.13

\* cited by examiner

INFORMATION PROCESSING APPARATUS, INFORMATION PROCESSING SYSTEM AND MOBILE TERMINAL READING TAGS MOUNTED ON THE DEVICE COMPONENTS FOR OBTAINING STATUS OF THE DEVICE COMPONENTS

INCORPORATION BY REFERENCE

This application claims priority to Japanese Patent Application No. 2014-174242 filed on Aug. 28, 2014, the entire disclosure of which are incorporated herein by reference.

BACKGROUND

The present disclosure relates to information processing apparatuses, mobile terminals, and information processing systems and particularly relates to a technique for presenting information about an information processing apparatus to a user.

Recently, information processing apparatuses such as image forming apparatuses are becoming increasingly complex, so that the amount of information about each information processing apparatus, including manual information indicating various operations to be performed by a user, is becoming huge. It takes much time and effort for the user to acquire a desired piece of information from among such a huge amount of information, which is cumbersome. Therefore, it is important to appropriately present a piece of information desired by the user.

Conventionally, a technique for presenting a piece of information desired by a user from among information about information processing apparatuses is known. In such conventional technique, for example, an image forming apparatus has a bar code indicating an apparatus ID thereof and attached thereto. Furthermore, this image forming apparatus sends to a server a piece of status information indicating the status of the apparatus itself. Moreover, when a mobile terminal reads the apparatus ID indicated by the bar code and sends the apparatus ID to the server, the server identifies, from among respective pieces of status information on a plurality of image forming apparatuses stored in the server, a piece of status information on the image forming apparatus corresponding to the received apparatus ID and sends to the mobile terminal a piece of procedure display information (manual information) relating to the identified piece of status information. The mobile terminal displays the piece of procedure display information sent from the server. Thus, the user can know an operation procedure to be taken by the user in a current status of the image forming apparatus, by a simple operation of allowing the mobile terminal to read the bar code attached to the image forming apparatus.

SUMMARY

A technique improved over the above technique is proposed as one aspect of the present disclosure.

An information processing apparatus according to an aspect of the present disclosure includes a housing, a plurality of tags, a storage section, a communication section, and a communication control section. The housing accommodates a plurality of component devices serving functions provided in the information processing apparatus. The plurality of tags are mounted to individual locations on the housing relating to the respective associated component devices, each of the plurality of tags being embedded with a piece of device type information indicating the component device associated with the tag. The storage section is configured to store a plurality of component device information sets indicating respective sets of information about the component devices. The communication section is configured to send and receive data to and from a mobile terminal. The communication control section is configured to allow the communication section to receive data sent from the mobile terminal and allow the communication section to send back to the mobile terminal the component device information set about the component device indicated by the piece of device type information contained in the received data.

Furthermore, a mobile terminal according to another aspect of the present disclosure includes a display, a tag reader, a communication section, a communication control section, and a display control section. The tag reader is configured to read each of tags mounted to a plurality of locations on a housing of an information processing apparatus and acquire respective pieces of device type information indicating respective component devices of the information processing apparatus individually associated with the tags. The communication section is configured to send and receive data to and from the information processing apparatus. The communication control section is configured to allow the communication section to send, to the information processing apparatus, data containing the piece of device type information on the individual component device acquired by the tag reader and allow the communication section to receive a component device information set sent from the information processing apparatus in response to the data and indicating a set of information about the component device. The display control section is configured to allow the display to display the component device information set allowed to the communication section to receive by the communication control section.

Moreover, an information processing system according to still another aspect of the present disclosure includes the above-described information processing apparatus and the above-described mobile terminal capable of sending and receiving data to and from the information processing apparatus.

DETAILED DESCRIPTION

Figure 1:
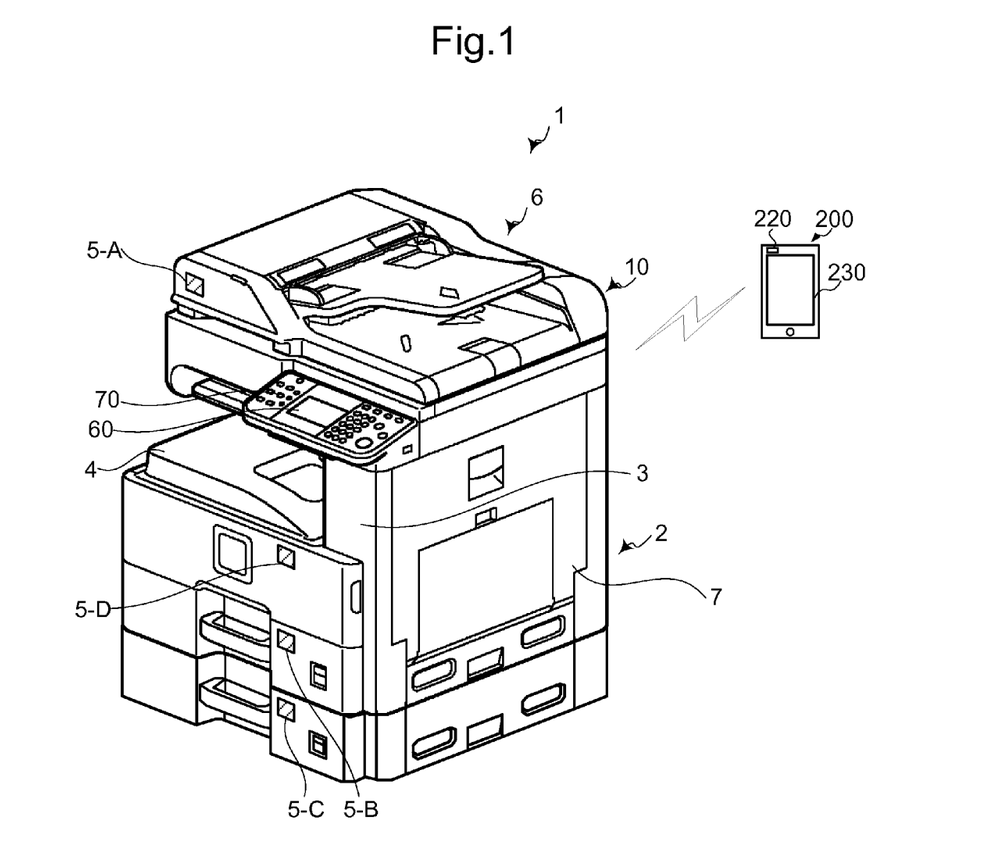
FIG. 1 is a perspective view showing the appearance of an image forming apparatus as an example of an information processing apparatus according to one embodiment of the present disclosure and the appearance of a mobile terminal according to the one embodiment of the present disclosure.
Figure 2:
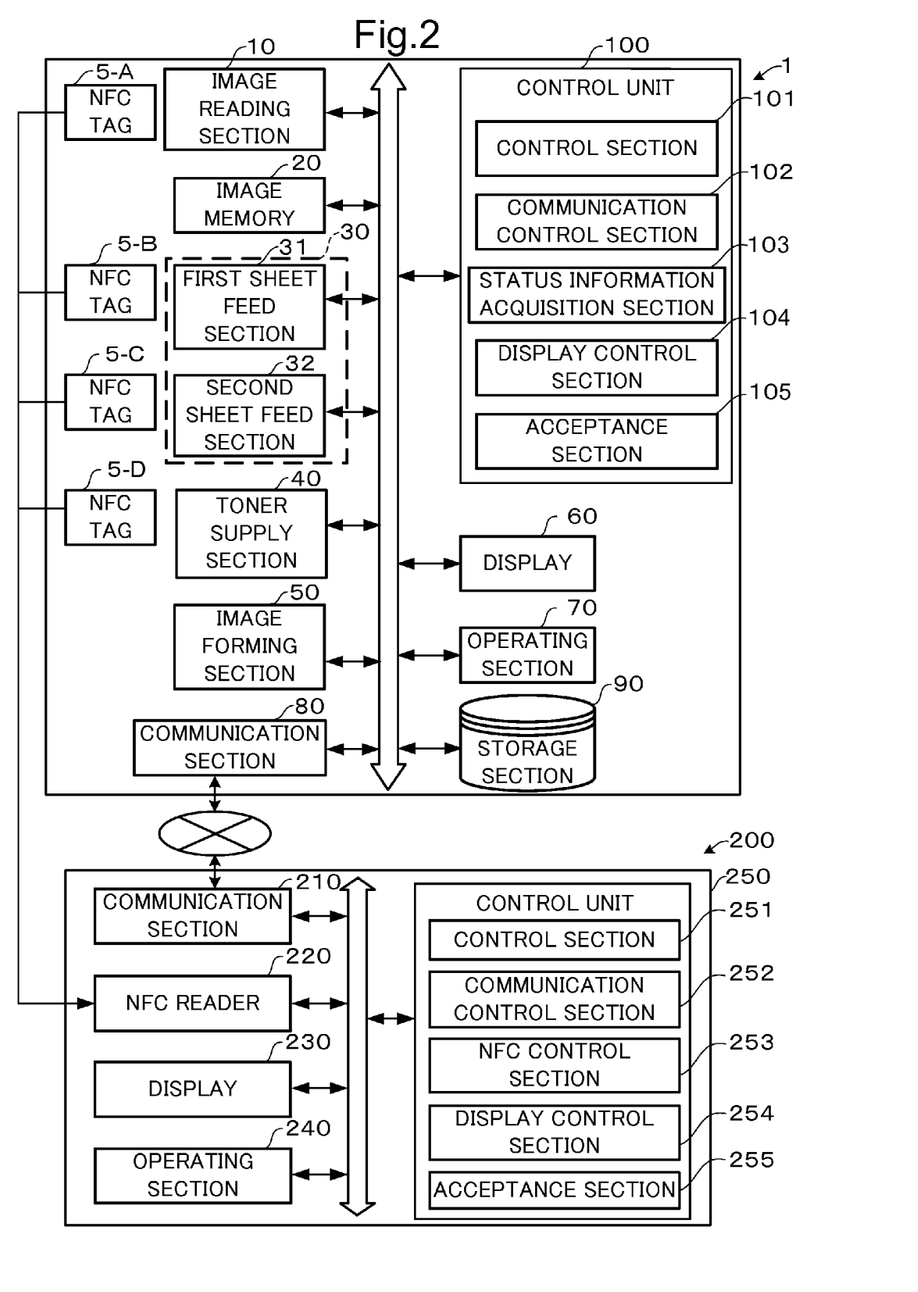
FIG. 2 is a block diagram showing internal configurations of the image forming apparatus and the mobile terminal according to the one embodiment of the present disclosure.
Figure 3A:
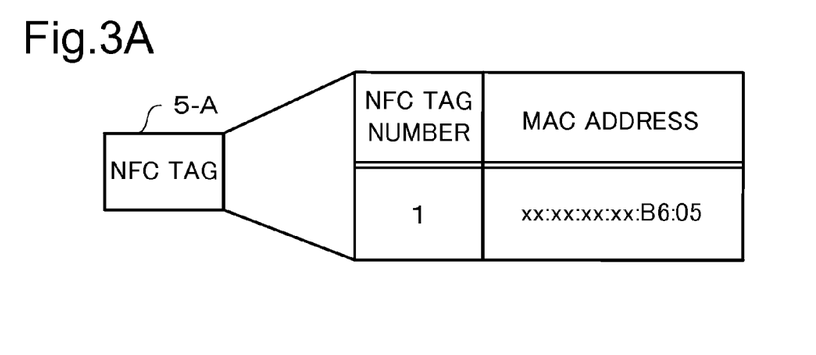
FIGS. 3A, 3B, 3C and 3D are diagrams showing examples of data contents stored in respective memories of NFC tags.
Figure 3B:
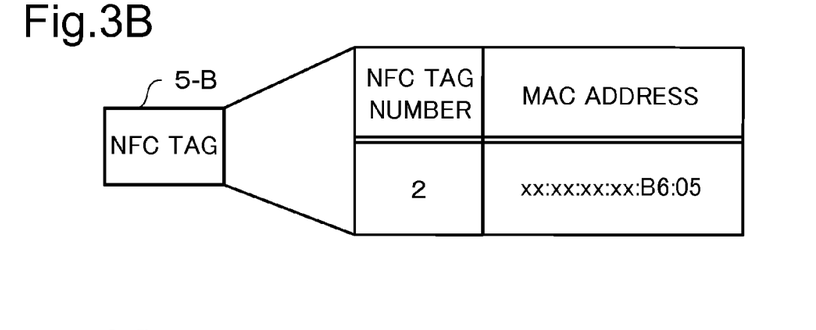
Figure 3C:
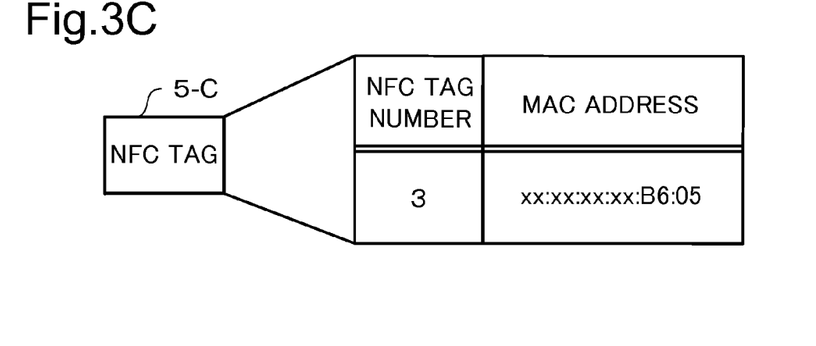
Figure 3D:
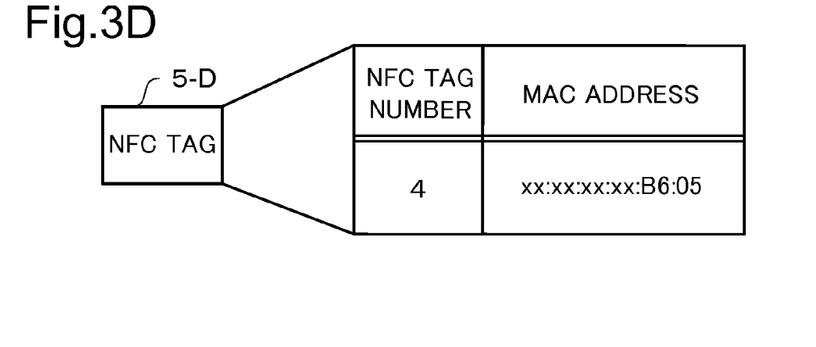

Hereinafter, a description will be given of an information processing apparatus, a mobile terminal, and an information processing system, all according to one embodiment of the present disclosure, with reference to the drawings. FIG. 1 is a perspective view showing the appearance of an image forming apparatus as an example of an information processing apparatus according to the one embodiment of the present disclosure and the appearance of a mobile terminal according to the one embodiment of the present disclosure. FIG. 2 is a block diagram showing internal configurations of the image forming apparatus and the mobile terminal according to the one embodiment of the present disclosure.

The image processing system according to the one embodiment of the present disclosure includes an image forming apparatus 1 and a mobile terminal 200 capable of communication with the image forming apparatus 1. First, a description will be given of the structure of the image forming apparatus 1.

The image forming apparatus 1 is a multifunction peripheral having multiple functions, including a facsimile communication function, a copy function, a print function, and a scan function. As shown in FIG. 1, the image forming apparatus 1 is roughly composed of an apparatus body 2, an image reading section 10 disposed over the apparatus body 2, and a connecting portion 3 provided between the image reading section 10 and the apparatus body 2.

A housing 7 constituting a shell of the image forming apparatus 1 accommodates a plurality of component devices serving various functions of the image forming apparatus 1. For example, the housing 7 accommodates the image reading section 10 serving the scan function, a sheet feed section 30 serving a sheet feed function, a toner supply section 40 serving a toner supply function, and so on.

The image reading section 10 is an ADF (automatic document feeder) including a document conveyance section 6 and a scanner configured to optically read an original document being conveyed by the document conveyance section 6 or an original document placed on an unshown original glass plate. The image reading section 10 is configured to acquire image data becoming subject to image formation by reading original documents being subject to facsimile transmission document by document.

An image memory 20 is a region for temporarily storing image data read by the image reading section 10.

An image forming section 50 is configured to retrieve image data stored in the image memory 20 and form an image (print) on a paper sheet fed from the sheet feed section 30, using the retrieved image data. The printed paper sheet is discharged onto a paper output tray 4.

The sheet feed section 30 includes a first sheet feed section 31 and a second sheet feed section 32. Each of the first sheet feed section 31 and the second sheet feed section 32 includes a sheet feed cassette (not shown) and is configured to feed paper sheets accommodated in the sheet feed cassette, sheet by sheet toward the image forming section 50.

The toner supply section 40 includes a plurality of toner containers (not shown) containing cyan, magenta, yellow, and black toners, respectively, and is configured to supply the toner contained in each toner container to the image forming section 50.

A display 60 is disposed on the front side of the image forming apparatus 1 and formed by including a liquid crystal display (LCD) or an organic light-emitting diode (OLED) display. The display 60 is configured to display, for example, a menu screen presenting setting items settable on the image forming apparatus 1.

An operating section 70 includes a start key for entering an instruction to execute, for example, a print job, a determination key (enter key) for performing a determination operation for a GUI forming the menu screen, and numerical entry keys for entering numerical values and is configured to accept user's operations regarding screens displayed on the display 60.

A communication section 80 is a communication interface including an unshown communication module, such as a LAN chip. The image forming apparatus 1 is connected via a network to the mobile terminal 200, such as a smartphone or a tablet terminal. The communication section 80 is configured to send and receive data to and from the mobile terminal 200 under the control of a communication control section 102 to be described hereinafter or the like.

A storage section 90 is a large storage device such as an HDD (hard disk drive). The storage section 90 is configured to store image data read by the image reading section 10. The storage section 90 is further configured to store sets of information about component devices, such as the image reading section 10, the sheet feed section 30, and the toner supply section 40, accommodated in the housing 7 (component device information sets). The detailed contents of data stored in the storage section 90 will be described hereinafter.

Furthermore, the image forming apparatus 1 is provided with NFC (near field communication) tags 5-A, 5-B, 5-C, and 5-D mounted to a plurality of predetermined locations on the housing 7. Each of the NFC tags 5-A, 5-B, 5-C, and 5-D (tags) includes: a memory (not shown) storing data to be sent to a below-described NFC reader 220 (tag reader) of the mobile terminal 200; and an antenna coil (not shown) capable of sending and receiving data to and from the NFC reader 220. When the mobile terminal 200 comes close to the NFC tag 5-A, 5-B, 5-C or 5-D, power is supplied to the antenna coil of the NFC tag by electromagnetic induction of an NFC coil incorporated in the mobile terminal 200. Each of the NFC tags 5-A, 5-B, 5-C, and 5-D uses the supplied power to send data to the NFC reader 220.

The NFC tags 5-A, 5-B, 5-C, and 5-D are mounted to individual locations on the housing 7 relating to respective associated component devices, such as the image reading section 10, the sheet feed section 30, and the toner supply section 40, accommodated in the housing 7. Specifically, the NFC tag 5-A is mounted to a location on the housing 7 near where the image reading section 10 is accommodated in the housing 7, which is a location relating to the image reading section 10. The NFC tag 5-B is mounted to a location on the housing 7 near where the first sheet feed section 31 is accommodated in the housing 7, which is a location relating to the first sheet feed section 31. The NFC tag 5-C is mounted to a location on the housing 7 near where the second sheet feed section 32 is accommodated in the housing 7, which is a location relating to the second sheet feed section 32. The NFC tag 5-D is mounted to a location on the housing 7 near where the toner supply section 40 is accommodated in the housing 7, which is a location relating to the toner supply section 40.

FIGS. 3A to 3D are diagrams showing examples of data contents stored in the respective memories of the NFC tags 5-A, 5-B, 5-C, and 5-D. As shown in these figures, each of the memories of the NFC tags 5-A, 5-B, 5-C, and 5-D stores an NFC tag number unique for each NFC tag and a MAC address of the image forming apparatus 1 (address information thereon). The NFC tag number serves as a piece of device type information indicating the component device associated with the NFC tag.

For example, the NFC tag number "1" shows that the NFC tag 5-A is associated with the component device which is the image reading section 10. The NFC tag number "2" shows that the NFC tag 5-B is associated with the component device which is the first sheet feed section 31. The NFC tag number "3" shows that the NFC tag 5-C is associated with the component device which is the second sheet feed section 32. The NFC tag number "4" shows that the NFC tag 5-D is associated with the component device which is the toner supply section 40. Although the above description has been given of the case where the MAC address of the image forming apparatus 1 is stored in the memories of the NFC tags 5-A, 5-B, 5-C, and 5-D, the piece of information to be stored in the memories of the NFC tags 5-A, 5-B, 5-C, and 5-D is not limited to the MAC address but may be any piece of information enabling the identification of the image forming apparatus 1 over the network.

As thus far described, the NFC tags 5-A, 5-B, 5-C, and 5-D have the same configuration except for their locations and the data contents stored in their memories. Therefore, hereinafter, one NFC tag, when described distinctively from the others, is noted by adding the suffix "-A", "-B" or so on to the reference numeral "5" and, when described indistinctively from the others, is noted simply as the "NFC tag 5" without adding the suffix "-A", "-B" or so on to the reference numeral "5".

The image forming apparatus 1 further includes a control unit 100. The control unit 100 is composed of a CPU (central processing unit), a RAM (random access memory), a ROM (read only memory), and so on. When a control program, such as an information processing program, stored in the above ROM or storage section 90 is executed by the above CPU, the control unit 100 functions as a control section 101, the communication control section 102, a status information acquisition section 103, a display control section 104, and an acceptance section 105. Alternatively, each of the sections of the control unit 100 may not be implemented by the operation of the control unit 100 in accordance with the aforementioned control program but may be constituted by a hardware circuit.

The control section 101 governs the overall operation control of the image forming apparatus 1. The control section 101 is connected to the image reading section 10, the image memory 20, the sheet feed section 30, the toner supply section 40, the image forming section 50, the display 60, the operating section 70, the communication section 80, the storage section 90, and so on and performs the operation control of the above components connected thereto and signal or data transfer to and from the components.

The communication control section 102 has the function of controlling a data communication operation of the communication section 80.

The status information acquisition section 103 is configured to acquire respective pieces of status information indicating the current operating statuses of the component devices, such as the sheet feed section 30, the toner supply section 40, and so on, accommodated in the housing 7. For example, the status information acquisition section 103 acquires the stack levels of paper sheets contained in the sheet feed trays of the first sheet feed section 31 and the second sheet feed section 32 as respective pieces of status information on the first and second sheet feed section 31, 32 by acquiring signals output from sheet stack level detecting sensors provided in the sheet feed trays of the first and second sheet feed sections 31, 32. For another example, the status information acquisition section 103 acquires the toner levels in the toner containers for different colors in the toner supply section 40 as a piece of status information on the toner supply section 40 by acquiring signals output from toner level detecting sensors provided in the toner containers for different colors. The status information acquisition section 103 allows the storage section 90 to store the acquired pieces of status information.

Figure 4:
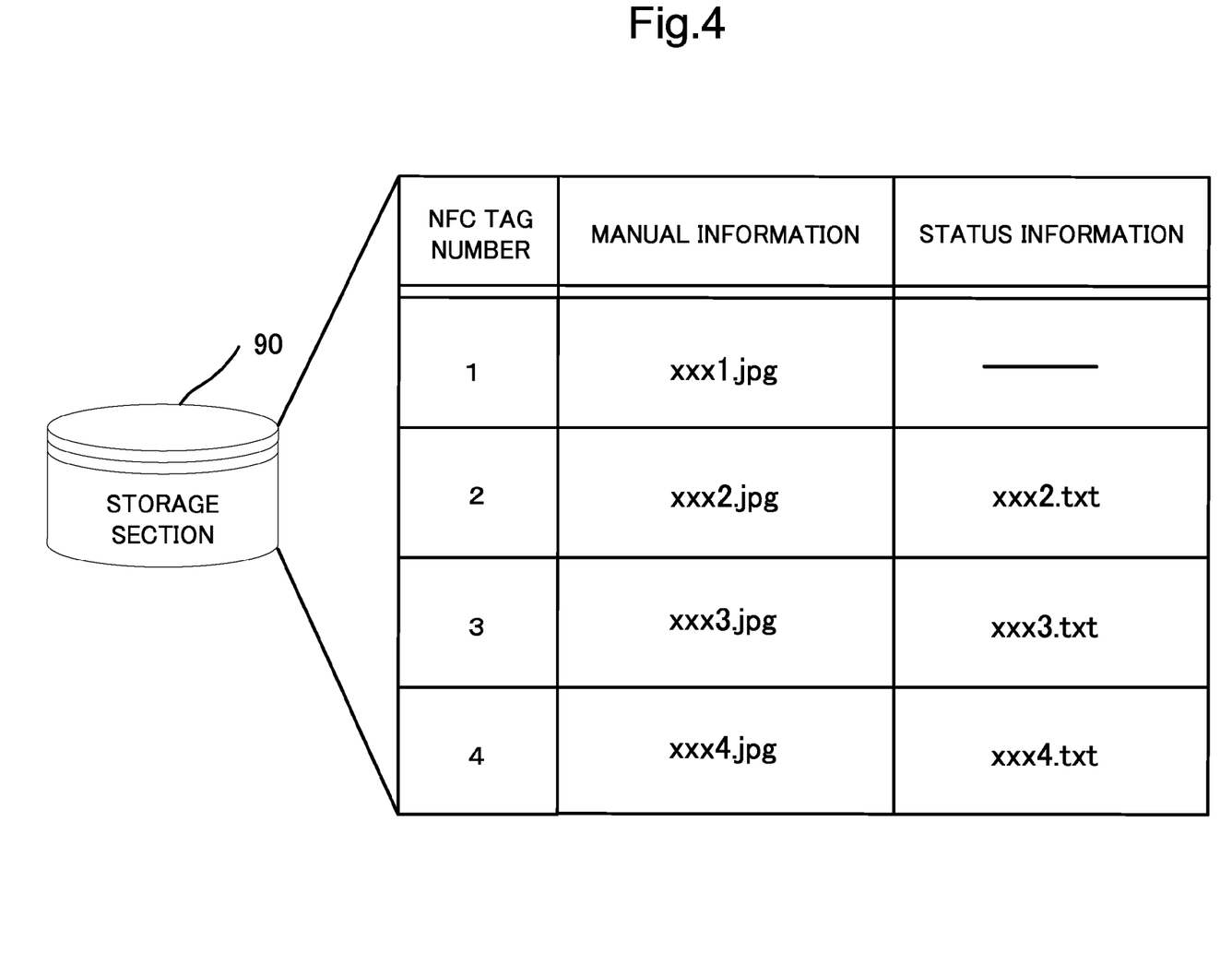
FIG. 4 is a diagram showing an example of data contents stored in a storage section.

FIG. 4 is a diagram showing an example of data contents stored in the storage section 90. The storage section 90 holds, as an information set about each of the component devices, such as the image reading section 10, the sheet feed section 30, the toner supply section 40, and so on, accommodated in the housing 7, a piece of manual information indicating operations to be performed for the individual component device by a user and a piece of status information indicating the current operating status of the individual component device. These pieces of information are stored in the storage section 90 in association with the NFC tag 5 mounted on the location relating to the relevant component device.

For example, the storage section 90 holds "xxx2.jpg" as a piece of manual information indicating, for example, how to load paper sheets into the sheet feed tray of the first sheet feed section 31, and "xxx2.txt" as a piece of status information indicating the sheet stack level in the sheet feed tray of the first sheet feed section 31 by associating these pieces of information with the NFC tag number "2" for the NFC tag 5-B mounted on the location relating to the first sheet feed section 31.

The storage section 90 further holds "xxx1.jpg" as a piece of manual information indicating how to scan an original document using the image reading section 10 by associating this piece of information with the NFC tag number "1" for the NFC tag 5-A mounted on the location relating to the image reading section 10. Because the image reading section 10 contains no consumables such as paper sheets or toner, unlike the sheet feed section 30 and the toner supply section 40, the storage section 90 holds no piece of status information on the image reading section 10 in association with the NFC tag number "1".

The communication control section 102 is configured to allow the communication section 80 to receive data sent from the mobile terminal 200. Then, if the received data contains a send request instruction to send an information set about an component device accommodated in the housing 7, the communication control section 102 allows the communication section 80 to send to the mobile terminal 200 the information set about the component device indicated by the NFC tag number which is a piece of device type information contained in the send request instruction. For example, when the communication section 80 receives a send request instruction in which the NFC tag number "4" is indicated, the communication control section 102 allows the communication section 80 to send to the mobile terminal 200 a piece of manual information "xxx4.jpg" and a piece of status information "xxx4.txt", both associated with the NFC tag number "4".

The display control section 104 has the function of controlling the operation of the display 60 for displaying an image.

The acceptance section 105 has the function of accepting an instruction based on a user's operation, entered using the operating section 70 or the like.

Next, a description will be given of the structure of the mobile terminal 200. The mobile terminal 200 includes a communication section 210, an NFC reader 220, a display 230, an operating section 240, and a control unit 250.

The communication section 210 is a communication interface including an unshown communication module, such as a LAN chip. The communication section 210 is configured to send and receive data to and from the image forming apparatus 1 under the control of a communication control section 252 to be described hereinafter or the like.

The NFC reader 220 includes an NFC coil (not shown) capable of sending and receiving data to and from each NFC tag 5 and is configured to receive data stored in the memory of the NFC tag 5 under the control of an NFC control section 253 to be described hereinafter or the like.

The display 230 is formed by including a liquid crystal display or an organic light-emitting diode display. The display 230 is configured to display, under the control of a display control section 254 to be described hereinafter or the like, information sets, received by the communication section 210, about the component devices, such as the image reading section 10, the sheet feed section 30, and the toner supply section 40, accommodated in the housing 7.

The operating section 240 is a touch panel disposed on the front of the display 230 and is configured to accept from a user various operations regarding screens displayed on the display 230.

The control unit 250 is composed of a CPU (central processing unit), a RAM (random access memory), a ROM (read only memory), and so on. When a control program, such as an information processing program, stored in the above ROM or the like is executed by the above CPU, the control unit 250 functions as a control section 251, the communication control section 252, the NFC control section 253, the display control section 254, and an acceptance section 255. Alternatively, each of the sections of the control unit 250 may not be implemented by the operation of the control unit 250 in accordance with the aforementioned control program but may be constituted by a hardware circuit.

The control section 251 governs the overall operation control of the mobile terminal 200. The control section 251 is connected to the communication section 210, the NFC reader 220, the display 230, the operating section 240, and so on and performs the operation control of the above components connected thereto and signal or data transfer to and from the components.

Figure 5:
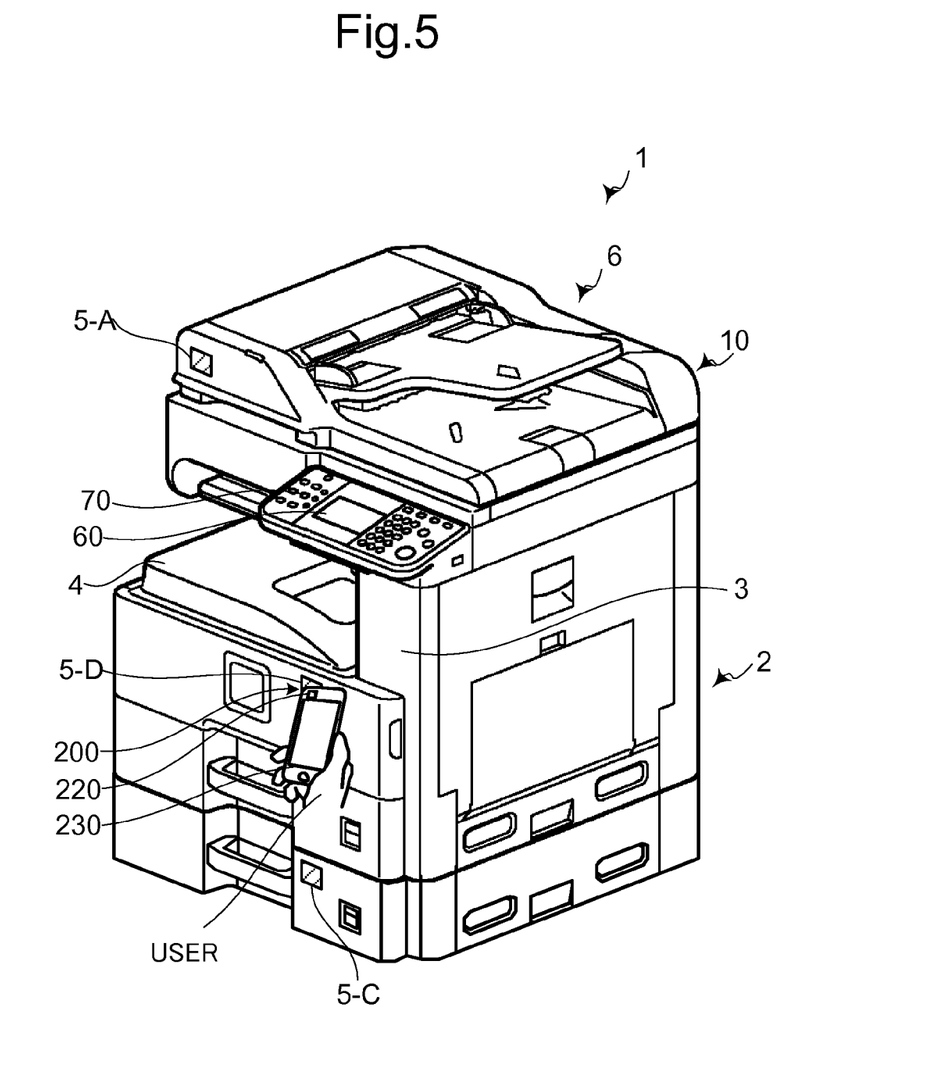
FIG. 5 is a view showing an operation of holding the mobile terminal over an NFC tag.

The NFC control section 253 has the function of controlling an NFC communication operation of the NFC reader 220. When, as shown in FIG. 5, a user holds the mobile terminal 200 over an NFC tag 5, the NFC reader 220 provided in the mobile terminal 200 comes close to the NFC tag 5. In this state, power is supplied to the NFC tag 5 and the NFC tag 5 thus sends a notification signal notifying of the activation of the NFC tag 5. When the NFC reader 220 receives the notification signal, the NFC control section 253 allows the NFC reader 220 to send to the NFC tag 5 a send request signal requesting to send data. When receiving the send request signal, the NFC tag 5 sends to the NFC reader 220 a unique NFC tag number for the NFC tag 5 and the MAC address for the image forming apparatus 1 which are stored in the memory. The NFC control section 253 allows the NFC reader 220 to receive the sent NFC tag number and MAC address.

The communication control section 252 has the function of controlling a data communication operation of the communication section 210. Specifically, the communication control section 252 allows the communication section 210 to perform data communication with the image forming apparatus 1 identified by the MAC address received by the NFC reader 220. In this data communication, the communication control section 252 allows the communication section 210 to send to the image forming apparatus 1 a send request instruction containing an NFC tag number contained in the set of information received by the NFC reader 220. Furthermore, the communication control section 252 allows the communication section 210 to receive an information set, sent from the image forming apparatus 1 in response to the send request instruction, about a component device serving as a constituent of the image forming apparatus 1.

The display control section 254 has the function of controlling the operation of the display 230 for displaying an image. Particularly, the display control section 254 allows the display 230 to display the information set about the component device, which the communication control section 252 has allowed the communication section 210 to receive.

The acceptance section 255 has the function of accepting an instruction based on a user's operation, entered using the operating section 240 or the like.

Figure 6:
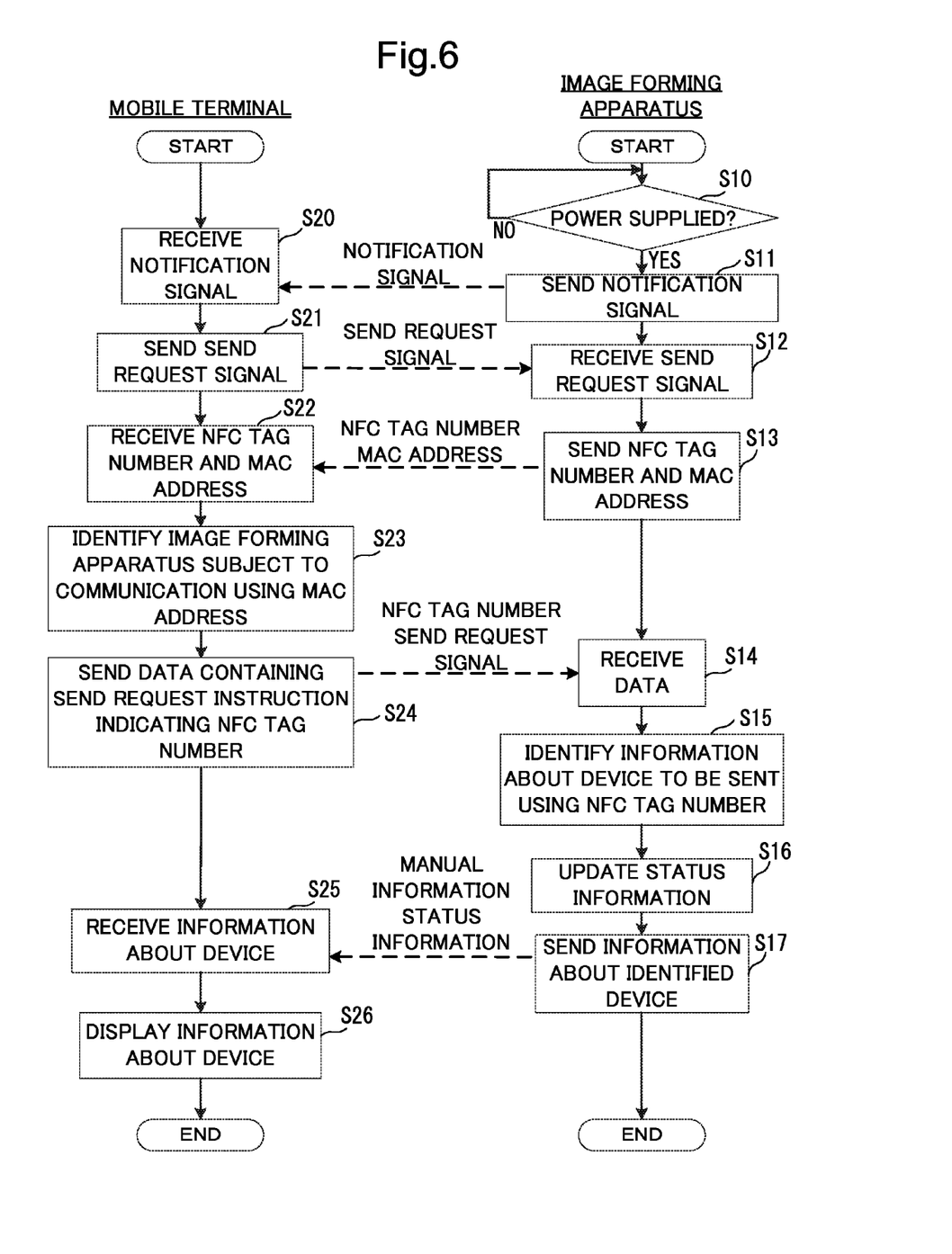
FIG. 6 is a flowchart showing an operation flow of the image forming apparatus and the mobile terminal according to the one embodiment of the present disclosure.

Next, a description will be given of a specific operation flow of the image forming apparatus 1 and mobile terminal 200 having the above configurations. FIG. 6 is a flowchart showing an operation flow of the image forming apparatus 1 and the mobile terminal 200.

When a user holds the mobile terminal 200 over an NFC tag 5 and power is thus supplied to the NFC tag 5 (YES in step S10), the NFC tag 5 sends to the mobile terminal 200 a notification signal notifying of the activation of the NFC tag 5 (step S11).

When the NFC reader 220 of the mobile terminal 200 receives the notification signal (step S20), the NFC control section 253 allows the NFC reader 220 to send a send request signal to the NFC tag 5 (step S21).

When the NFC tag 5 receives the send request signal (step S12), the NFC tag 5 sends to the mobile terminal 200 the NFC tag number and the MAC address both stored in the memory of the NFC tag 5 (step S13).

When the NFC reader 220 receives the NFC tag number and the MAC address (step S22), the communication control section 252 uses the received MAC address to identify the image forming apparatus 1 being subject to communication over the network (step S23).

Then, the communication control section 252 allows the communication section 210 to send to the identified image forming apparatus 1 data containing a send request instruction in which the NFC tag number received in the processing of step S22 is indicated (step S24).

When the communication section 80 of the image forming apparatus 1 receives the data (step S14), the communication control section 102 uses the NFC tag number contained in the received data to identify one NFC tag 5 from among the NFC tags 5-A, 5-B, 5-C, and 5-D. Then, the communication control section 102 identifies, from among the respective information sets about the plurality of component devices stored in the storage section 90 and each containing a piece of manual information and a piece of status information, an information set about the component device associated with the identified NFC tag 5 as an information set to be sent (step S15).

After the processing of step S15, the status information acquisition section 103 updates the piece of status information stored in the storage section 90 to latest data (step S16).

The communication control section 102 allows the communication section 80 to send to the mobile terminal 200 the information set about the component device identified as the information set to be sent in the processing of step S15 (step S17). In other words, in the processing of steps S15 and S17, the communication control section 102 allows the communication section 80 to send to the mobile terminal 200 the information set about the component device indicated by the piece of device type information (NFC tag number) contained in the data sent from the mobile terminal 200.

When the communication section 210 of the mobile terminal 200 receives the information set about the component device, containing a piece of manual information and a piece of status information, (step S25), the display control section 254 allows the display 230 to display the received information set about the component device (step S26).

Figure 7:
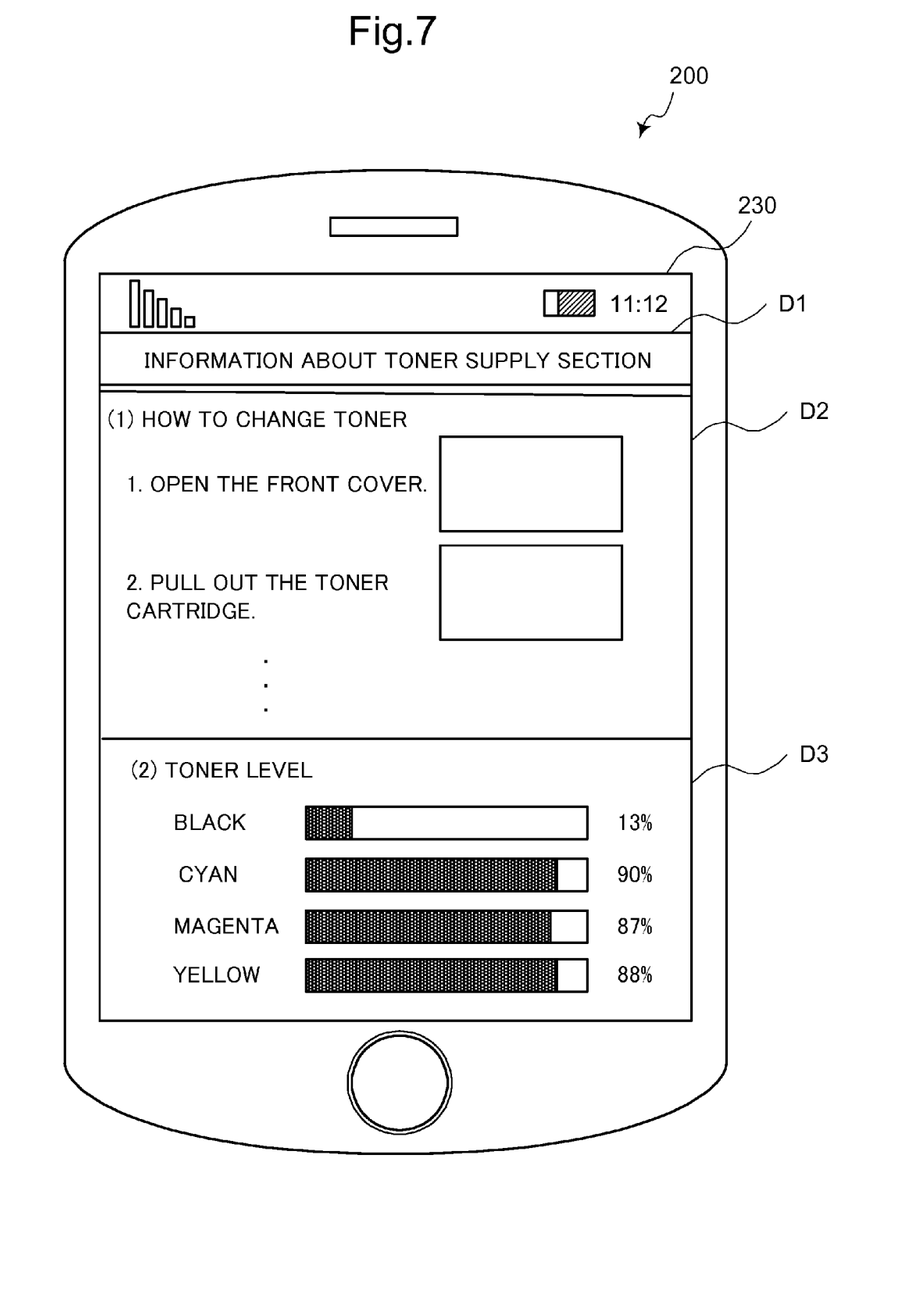
FIG. 7 is a view showing an example of a screen displayed on a display.

FIG. 7 is a view showing an example of a screen displayed on the display 230. FIG. 7 shows a display screen when the user holds the mobile terminal 200 over the NFC tag 5-D, in which the display 230 displays a screen D1 that contains an image D2 indicating how to replace a toner cartridge, which is a piece of manual information, and an image D3 indicating the toner level, which is a piece of status information. In this manner, the display 230 displays on a single screen a piece of manual information and a piece of status information both sent from the image forming apparatus 1.

Meanwhile, an information processing apparatus such as an image forming apparatus is composed of a plurality of component devices serving various functions. For example, an image forming apparatus includes an image reading device serving a scan function, a sheet feeder serving a sheet feed function, and so on. The previously described conventional technique can present to a user information about an information processing apparatus in keeping with the current status of the apparatus, but however, cannot present to the user an information set about user's desired one of the plurality of component devices constituting the information processing apparatus. Furthermore, the above information set should preferably be presented to the user by a simple operation.

In view of the above, in the present disclosure, a plurality of NFC tags 5 are mounted to individual predetermined locations relating to the respective associated component devices, such as the image reading section 10, the sheet feed section 30, the toner supply section 40, and so on, accommodated in the housing 7. Simply by holding the mobile terminal 200 over the NFC tag 5 mounted to the location relating to the component device the information about which a user desires to know, the user can acquire desired information. Therefore, in the present disclosure, an information set about user's desired one of the plurality of component devices constituting the image forming apparatus 1 can be presented to the user by a simple operation.

The present disclosure is not limited to the above embodiment and can be modified in various ways.

For example, although in the above embodiment the description has been given of the case where information embedded in the NFC tag 5 mounted on the image forming apparatus 1 is read with the NFC reader 220 of the mobile terminal 200, the present disclosure is not necessarily limited to this case. Alternatively, another type of electronic tag, such as an RFID (radio-frequency identifier) tag, and an electronic reader capable of reading the electronic tag may be used.

Although in the above embodiment the description has been given of the case where an NFC tag number is embedded as a piece of device type information into the NFC tag 5, the present disclosure is not necessarily limited to this case. Instead of a number such as an NFC tag number, text data directly indicating a component device such as the first sheet feed section or the toner supply section may be embedded into the NFC tag.

Although in the above embodiment the description has been given of the case where in the processing of step S17 shown in FIG. 6 the communication control section 102 of the image forming apparatus 1 allows the communication section 80 to send to the mobile terminal 200 a piece of manual information and a piece of status information both stored in the storage section 90, the present disclosure is not necessarily limited to this case. When the storage section 90 does not store a piece of manual information or a piece of status information on the component device identified as a piece of information to be sent in the processing of step S15 or when information to be sent is stored in the storage section 90 but the amount of information stored does not reach a predetermined amount of information, the communication control section 102 may allow the communication section 80 to acquire necessary information from an external server. In this case, the communication control section 102 allows the communication section 80 to send to the mobile terminal 200 the information, such as a piece of manual information, acquired from the external server.

Furthermore, when in the processing of step S17 shown in FIG. 6 necessary information such as a piece of manual information is not sent from the image forming apparatus 1 or when information is sent but the amount of information sent does not reach a predetermined amount of information, the communication control section 252 of the mobile terminal 200 may allow the communication section 210 to acquire necessary information from the external server. In this case, in the processing of step S26, the display control section 254 allows the display 230 to display the information, such as a piece of manual information, acquired from the external server.

Thus, even if the storage section 90 does not store a piece of manual information or a piece of status information on the component device identified as a piece of information to be sent in the processing of step S15 or even if information to be sent is stored in the storage section 90 but the amount of information stored does not reach the predetermined amount of information, a necessary piece of information such as a piece of manual information can be displayed on the display 230 of the mobile terminal 200.

The control program described in the above embodiment may be one stored on a computer-readable non-transitory recording medium, such as a hard disk, a CD-ROM, a DVD-ROM or a semiconductor memory. In such a case, a computer-readable non-transitory recording medium with the control program recorded thereon is one embodiment of the present disclosure.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An information processing apparatus comprising:
a housing accommodating a plurality of component devices serving functions provided in the information processing apparatus;
a plurality of tags mounted to individual locations on the housing relating to respective associated component devices, each of the plurality of tags being previously embedded with a piece of device type information indicating a component device associated with the tag, the piece of device type information embedded in one of the plurality of tags being different from other device type information embedded in the other tag and being read by a tag reader included in a mobile terminal when the mobile terminal comes close to one tag;
a storage section configured to store in association with the piece of device type information a plurality of component device information sets indicating respective sets of information about the component devices;
a communication section configured to send and receive data to and from the mobile terminal; and
a communication control section configured to allow the communication section to receive data sent from the mobile terminal, the data containing the piece of device type information that has been acquired by the mobile terminal when the mobile terminal read one of the plurality of tags, and allow the communication section to send back to the mobile terminal, out of the plurality of component device information sets stored in the storage section, the component device information set about the component device having been stored in association with the piece of device type information sent from the mobile terminal.

2. The information processing apparatus according to claim 1, wherein each of the tags is embedded with, in addition to the piece of device type information, a piece of address information for use in identifying the information processing apparatus over a network.

3. The information processing apparatus according to claim 1, wherein the storage section is configured to store, as the plurality of component device information sets, information sets each containing a piece of manual information indicating operations to be performed for an individual component device by a user.

4. The information processing apparatus according to claim 1, further comprising a status information acquisition section configured to acquire respective pieces of status information indicating current operating statuses of the component devices from the component devices,
wherein the storage section is further configured to store, as the plurality of component device information sets, information sets each containing an individual piece of status information acquired by the status information acquisition section.

5. An information processing system comprising an information processing apparatus and a mobile terminal capable of sending and receiving data to and from the information processing apparatus,
the information processing apparatus comprising:
a housing accommodating a plurality of component devices serving functions provided in the information processing apparatus;
a plurality of tags mounted to individual locations on the housing relating to the respective associated component devices, each of the plurality of tags being previously embedded with a piece of device type information indicating the component device associated with the tag, the piece of device type information embedded in one of the plurality of tags being different from other device type information embedded in other tag and being read by a tag reader included in the mobile terminal when the mobile terminal comes close to one tag;
a storage section configured to store in association with the piece of device type information a plurality of component device information sets indicating respective sets of information about the component devices;
a first communication section; and
a communication control section configured to allow the first communication section to receive data sent from the mobile terminal, the data containing the piece of device type information that has been acquired by the mobile terminal when the mobile terminal read one of the plurality of tags, and allow the first communication section to send back to the mobile terminal out of the plurality of component device information sets stored in the storage section, the component device information set about the component device having been stored in association with the piece of device type information sent from the mobile terminal,
the mobile terminal comprising:
a display;
a tag reader configured to read each the tags mounted to the plurality of locations on the housing of the information processing apparatus and acquire respective pieces of device type information individually associated with the tags;
a second communication section;
a communication control section configured to allow the second communication section to send, to the information processing apparatus, the data containing the piece of device type information on an individual component device acquired by the tag reader and allow the second communication section to receive the component device information set sent from the information processing apparatus in response to the data; and
a display control section configured to allow the display to display the component device information set allowed to the second communication section to receive by the communication control section.

* * * * *